United States Patent [19]

McGee et al.

[11] Patent Number: 5,373,327
[45] Date of Patent: Dec. 13, 1994

[54] DETECTION, CORRECTION AND DISPLAY OF ILLEGAL COLOR INFORMATION IN A DIGITAL VIDEO SIGNAL

[75] Inventors: Daniel R. McGee, Saratoga; Matthew H. Klein, Mountain View, both of Calif.

[73] Assignee: Hewlett-Packard Company, Palo Alto, Calif.

[21] Appl. No.: 23,248

[22] Filed: Feb. 25, 1993

[51] Int. Cl.$^5$ .............................................. H04N 09/64
[52] U.S. Cl. ..................................... 348/645; 348/180
[58] Field of Search ................. 358/27, 185, 311, 139, 358/10, 28, 21 R, 518, 520, 537; 340/703 A–F; H04N 9/68, 9/69, 05/222

[56] References Cited

U.S. PATENT DOCUMENTS

| | | | |
|---|---|---|---|
| 4,549,295 | 10/1985 | Purvis | 371/13 |
| 4,698,664 | 10/1987 | Nichols et al. | 358/10 |
| 4,706,111 | 11/1987 | Abe et al. | 358/21 R |
| 4,707,727 | 11/1987 | Penney | 358/10 |
| 4,731,662 | 3/1988 | Udagawa et al. | 358/75 |
| 4,835,626 | 5/1989 | Wilkinson et al. | 360/14.3 |
| 5,089,882 | 2/1992 | Kaye et al. | 358/28 |

OTHER PUBLICATIONS

"The Chroma Predictor Operation And Set-Up", Encore Video Industries, Hollywood, Calif. 90028, 4 pages.

"Proposed SMPTE Recommended Practice: Error Detection Checkwords And Status Flags For Use In Bit-Serial Digital Interfaces For Television", RP 165, 5 pages.

"Serial Interface/Transmission Decoder: SBX 1602A", Sony Corporation, E90722A16-ST, pp. 1-27.

"Serial Interface/Transmission Encoder: SBX 1601A", Sony Corporation, E90723A16-ST, pp. 1-24.

CCIR Recommendation 601-2, Section 11 F: Digital Methods of Transmitting Television Information, "Encoding Parameters of Digital Television For Studios", 1990, pp. 95-104.

CCIR Recommendation 656, "Interfaces For Digital Component Video Signals In 525-line and 625-line Television Systems", 1986, pp. 105-117.

*Primary Examiner*—Victor R. Kostak
*Assistant Examiner*—Nathan J. Flynn

[57] ABSTRACT

The present invention legalizes a video signal (e.g., 4:2:2 format) being processed in one format so that the video signal can be transformed to other formats (e.g., analog composite NTSC format). An editor can be notified of color legalities in a video signal. Further, each pixel of a video signal can be corrected to the nearest legal value by applying soft limits and gain slopes to a constant luminance color correction process. In accordance with the present invention, illegal colors of a video signal can be highlighted to provide an output drive for a video display which can be easily monitored by an editor. Alternate features of the present invention relate to error detecting and monitoring by assigning a specific, unique address to each video frame of a video signal. A further feature of the present invention relates to use of a pixel selecting means which receives 4:2:2 video data in either serial or parallel form. The data is converted to an analog component format and used to drive a video display monitor where the video image is displayed. The pixel selecting means can, for example, include a mouse/trackball input which is correlated to the video display monitor.

20 Claims, 5 Drawing Sheets

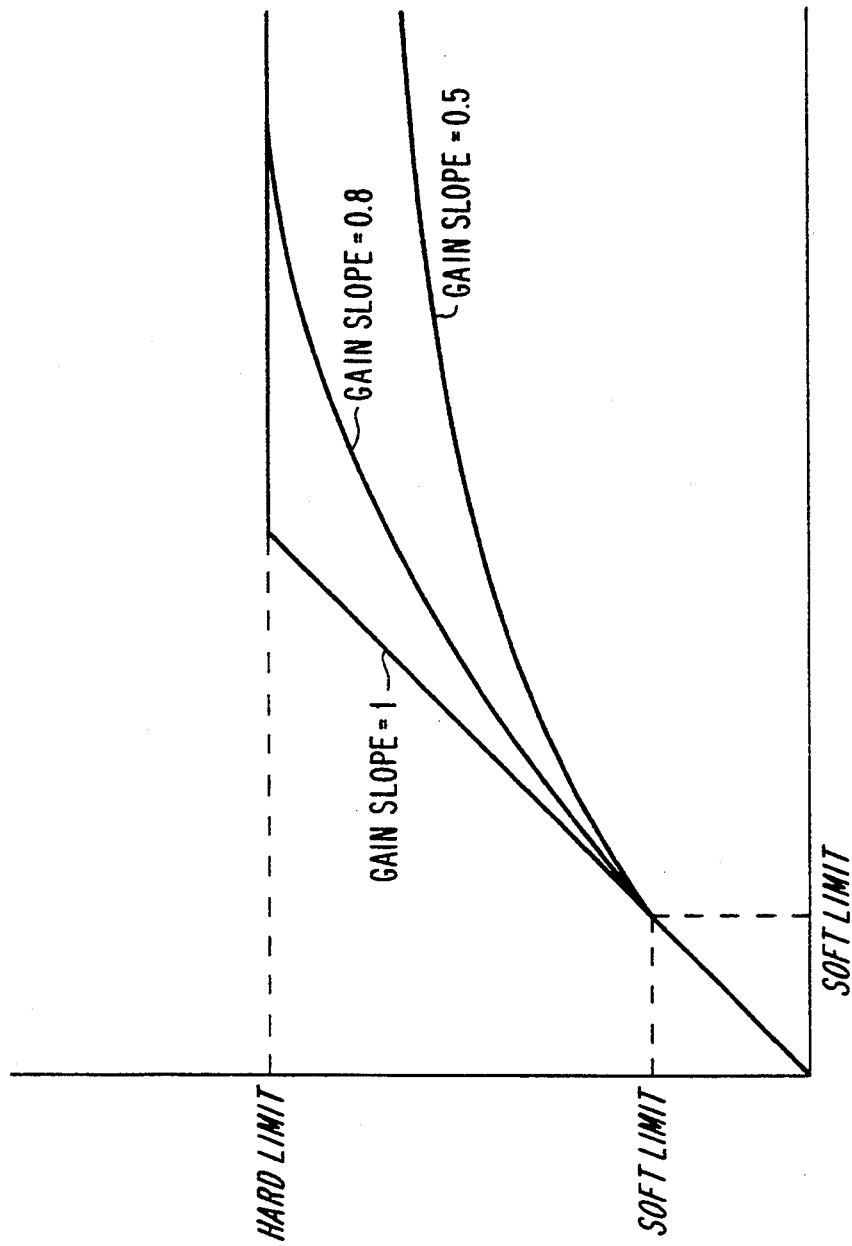

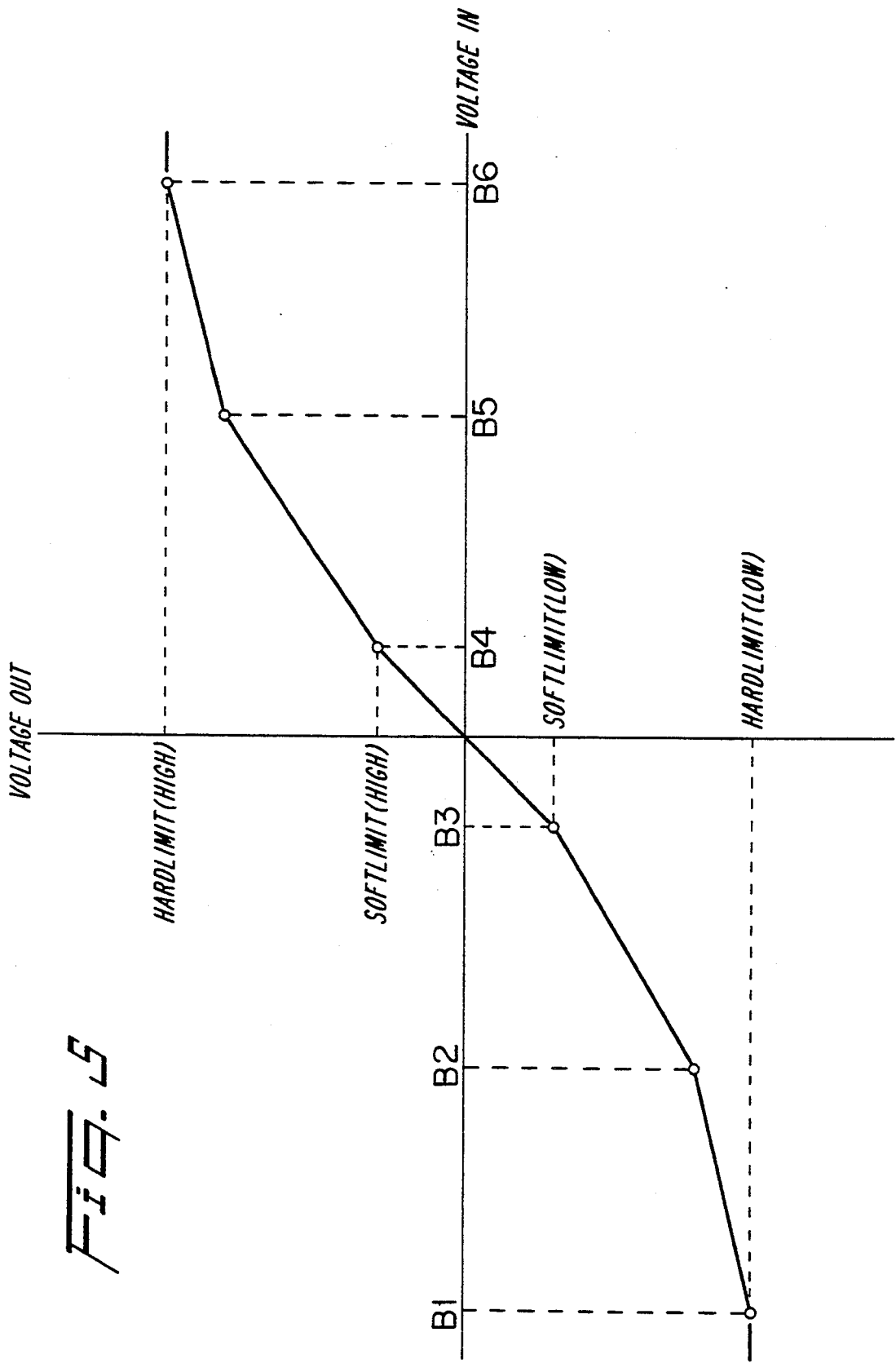

DETECTION, CORRECTION AND DISPLAY OF ILLEGAL COLOR INFORMATION IN A DIGITAL VIDEO SIGNAL

BACKGROUND OF THE INVENTION

1. Field of the Invention

The present invention relates generally to video signal processing, and more particularly, to detection, correction and display of video signals.

2. State of the Art

During video signal processing, numerous data formats are used to represent image information associated with each pixel of a video field so that an original image can be faithfully reproduced. For example, one common color format represents a color using red, green, and blue color components. With this color format, the color of each pixel is represented by quantities of red (R), green (G) and blue (B) color components detected in the original image (referred to hereafter as an R,G,B format). Another format used to represent a particular color is by the amounts of hue (Θ), saturation (S), and luminance (Y) included therein (referred to herein as the Y,S,Θ format).

Table 1 lists these two color formats, along with three additional color formats:

TABLE 1

| Rred  | Yluminance  | Yluminance  | Yluminance            | Yluminance            |
|-------|-------------|-------------|-----------------------|-----------------------|
| Ggreen| Ssaturation | Cchrominance| Uin phase chroma      | Crin phase chroma     |
| Bblue | Θhue        | Θhue        | Vquad phase chroma    | Cbquad phase chroma   |

A series of mathematical transformations exists between these various color formats. However, because each of these color formats is implemented differently in the real world, conflicts exist in moving between them. These conflicts derive from the fact that different color formats possess different characteristics, such as analog versus digital characteristics and component signal versus composite signal characteristics.

For example, the R,G,B color format is an analog format because the video signals are analog in nature and vary, for example, between 0 and +0.7 volts. Further, the R,G,B format is a component format because the entire video signal is transmitted in 3 component parts using three separate R,G,B signal paths. A common use of this transmission format is in computer graphics equipment and computer displays. This can be contrasted with a composite video signal, where the video signal is contained and transmitted in its entirety on a single signal path.

A Y,U,V format is an analog component format which is very similar to the R,G,B, format. The Y,U,V format includes a luminance (Y) component, an in phase chroma component (U) and a quadrature phase component (V). This format separates luminance (or brightness) information from chrominance (or color) information, wherein Y represents luminance, and U and V together represent chrominance. The Y,U,V format is sometimes preferred over the R,G,B format because a black and white monitor can be driven with just the Y signal. A transformation between the R,G,B and Y,U,V format is as follows:

$$Y = 0.299 * R + 0.587 * G + 0.144 * B$$

$$U = -0.148 * R - 0.289 * G + 0.437 * B \quad 0 \leq R, G, B, \leq 1$$

$$V = 0.615 * R - 0.515 * G - 0.100 * B$$

A Y,Cr,Cb format is a digital component format specified by the international standard set forth in CCIR 601/656 and frequently referred to as the 4:2:2 format. Generally speaking, the Y,Cr,Cb components are digital versions of the Y,U,V analog components.

The "4:2:2" designation refers to the use of a sampling rate for U and V components which is one half the sample rate for the Y component. For example, the Y component is sampled at 13.5 Mhz and the U and V components are sampled at 6.75 Mhz each. The precision of the digitization is typically 10 bits.

The 4:2:2 format is considered a high quality format and is therefore preferred for use in high end post production studios. Video signals received by a post production studio in another color format are typically transformed or converted from other color formats to the 4:2:2 format before editing begins. For example, analog components of the Y,U,V format can be converted to components in the 4:2:2 format using the following mathematical transformation:

$$Y(4:2:2) = Y * 876 + 64 \text{ decimal}$$

$$Cr = ((V/1.2296) + 0.5) \, 896 + 64 \text{ decimal}$$

$$Cb = ((U/0.8736) + 0.5) \, 896 + 64 \text{ decimal}$$

In contrast to component formats, a composite format encodes an entire video signal onto one signal path. An analog composite format is used primarily to distribute a video signal from an originating facility to a viewer where it is decoded and displayed on a television receiver. There are two primary analog composite formats: NTSC, used mainly in North America and Japan, and PAL, versions of which are used throughout Asia and Europe. The composite NTSC format can be derived from the analog component Y,U,V format using the following mathematical transformation:

$$\text{Amplitude} = [(Y+C) * .0925 + 0.075], \, 0.714 \text{ volts}$$

$$C = V * \sin(wt + 0.576) + U * \cos(wt + 0.576)$$

$$\omega = 3.579545 \text{ MHz}$$

A similar derivation exists for transforming the composite PAL format from the analog component Y,U,V format.

A typical use of various color formats in a post production studio is illustrated in FIG. 1. As mentioned previously, real world implementations impose restrictions on final values derived when transforming one color format into another color format. These restrictions can render a color which is legal in one color format, illegal in another color format.

As referenced herein, a "legal color" is a color which can be accurately reproduced by conventional video equipment in a given color format. An "illegal color" is a color which is outside the color space of conventional video equipment and which cannot be faithfully reproduced by the video equipment.

For example, where the Y,Cr,Cb components of the 4:2:2 format are each represented with a 10 bit word, each of these words must remain between a digital value of 0 and a digital value of 1024 decimal. In a typical analog R,G,B format, the individual R,G,B component signals must remain between 0 and 700 mV. The analog composite NTSC signal must typically remain between −142 mV and 785 mV (the limits for the PAL analog composite signal are slightly different). Transforming a legal 4:2:2 signal to one of these analog formats does not guarantee a legal analog signal. However, transformations between these various formats often can not be avoided.

For example, the output format of a post production studio must be analog composite to be compatible with typical end user (e.g., viewer) equipment. Because some post production studios prefer using the higher quality 4:2:2 digital component format for editing, transformation from the 4:2:2 format must be performed once all editing has been completed.

If an illegal analog composite signal exceeds predetermined limits (e.g., color space limits of conventional video equipment), the resultant video waveform will be distorted. For example, voltages greater than 785 mV (for NTSC) frequently stress the dynamic range of video tape recorders and clip the video signal being reproduced. Such clipping renders the resulting color of the video signal unpredictable.

Often the result of distortion due to illegal colors can be much more serious, causing entire portions of the picture to be significantly different from what was intended. For example, a pixel that is 100% amplitude yellow corresponds to legal values of 100% Red and 100% Green in the R,G,B component format. When this pixel is converted to the 4:2:2 format and then to the NTSC composite analog format, the peak voltage levels are 935 mV and 343 mV. 935 mV is significantly above a legal NTSC signal amplitude of 785 mV and cannot be represented in the NTSC format. In other words, 100% yellow is a legal R,G,B color but an illegal NTSC color.

If the video image is edited in an analog composite format, the editor can simply ensure that no signals above (or below) a certain limit are created. However, because editing in a 4:2:2 post production studio is done in a digital component format, the editor does not know what the peak analog composite levels will be after conversion. Further, each individual pixel in the video field has a different peak level and it is impossible for the editor to individually track every one. Thus, in a 4:2:2 post production studio, it is likely that colors the editor creates or acquires from other color formats cannot be represented in the analog composite format.

A first conventional approach used to address the foregoing problem takes the video signal in the 4:2:2 format and, at various monitoring points in the post production studio, converts it to an analog composite format. The analog composite signal can then be viewed on a traditional waveform monitor and the peak excursions measured to identify illegal colors.

There are at least two disadvantages to this first conventional approach. First, the waveform monitor displays all pixels of the video display in real time as they occur. For NTSC, there are approximately 14 million pixels every second. At this rate, it is impossible for the editor viewing the video signal waveform to detect every illegal color. Secondly, this conventional approach can only notify the editor that an illegal color has been detected.

A second conventional approach is referenced in a document entitled "The Chroma Predictor", from Encore Video Industries in Hollywood, Calif. This document describes receiving a video signal in the 4:2:2 format. Pixels of the video signal which are determined to be illegal are corrected to the nearest legal color of the 4:2:2 format in real time and merged with the legal 4:2:2 signal at an output. The result is a signal in the 4:2:2 format that is guaranteed to be legal when a final transformation to an analog composite format is made.

A key feature of this second conventional approach is that chrominance is reduced to render an illegal color legal, while hue and luminance are maintained constant. For example, once a color associated with a given pixel is determined to be illegal, the two chrominance values are adjusted as follows:

$$Cr' = X * (Cr - 512) + 512 \text{ decimal}$$

$$Cb' = X * (Cb - 512) + 512 \text{ decimal}$$

where Cr', Cb' are "legalized" versions of Cr and Cb; Y remains unchanged to preserve constant luminance. Further, the ratio between Cr and Cb remains unchanged to preserve constant hue. For an NTSC composite input video signal ($V_{in}$), X is determined as follows:

--- when Vin(high) > HARDLIMIT(high): for NTSC
$X = [(HARDLIMIT(high)/7.14 - 7.5)/92.5 - Py]/C$
when Vin(low) < HARDLIMIT(low): for NTSC
$X = [(7.5 - HARDLIMIT(low)/7.14)/92.5 + Py]/C$
where: $Py = (Y (4:2:2.) - 64)/876$  $Pr = (Cr - 64)/896 - 0.5$
$Pb = (Cb - 64)/896 - 0.5$
$U = 0.874 * Pb$  $V = 1.23 * Pr$  $C = (U^2 + V^2)^{0.5}$
HARDLIMITS are in millivolts

---

The disadvantage of this second approach is that it does not maintain the contrast of the original image in all areas of the image. For example, if an image of the sun contained many different levels of brightness, all of which are determined to be illegal, the entire image would be clipped to the HARDLIMIT value in the foregoing equation. This would distort the image by eliminating some or all of the original contrast.

In addition to the distortions which result from transforming illegal colors, conventional digital video processing systems are also susceptible to other drawbacks. For example, conventional systems used for processing a 4:2:2 digital video signal are unable to accurately detect, identify and log digital data errors relative to frames of the video signal in which they exist.

Conventional video processing systems merely tell an editor where errors occurred in a very general sense; i.e., by identifying an amount of time since the last error was detected. These systems do not describe exactly what video frames contain errors. Further, they do not tell the editor if any other errors occurred before the last error. Thus, errors that occur over a period of time are not individually noted and logged.

Another problem with video signal processing in a post production studio is the routing of the video signal from place to place using digital formats. This routing of digital signals hinders any useful display of the data for analytical or qualatative purposes.

Accordingly, there is a need for more effective processing, analysis and display of digital video data.

SUMMARY OF THE INVENTION

The present invention legalizes a video signal being processed in one format (e.g., 4:2:2 format) so that the video signal can be transformed to other formats (e.g., analog composite NTSC format). An editor can be notified of color illegalities in a video signal. Further, each pixel of a video signal can be corrected to the nearest legal value by applying soft limits and gain slopes to a color correction process, such as a constant luminance, constant hue color correction process. In accordance with the present invention, illegal colors of a video signal can be highlighted to provide an output drive for a video display which can be easily monitored by an editor.

Alternate features of the present invention relate to error detection and monitoring by logging a specific, unique address of each video signal frame that contains an error. In accordance with the present invention, each detected error in digital data of a video signal is logged with a frame identifier (e.g., an SMPTE time code) that corresponds to the frame in which the error occurred. This error detection capability allows an editor to review all detected errors along with their corresponding frame identifier. An error logging memory which records all detected errors and associated frame identifiers can be cleared to, for example, start a recording session or permit additional logging after the memory is full.

A further feature of the present invention relates to use of a pixel selecting means which receives 4:2:2 video data in either serial or parallel form. The data is converted to an analog component format and used to drive a video display monitor where the video image is displayed. The pixel selecting means can, for example, include a mouse/trackball input which is correlated to the video display monitor. As the mouse is moved, its movement is decoded and superimposed with a cursor on the component analog video signal. An internal display tracks movement of the mouse and displays a current line number and column number of the video display monitor (i.e., a selected pixel location) over which the cursor is presently located, as well as actual video signal data corresponding to that pixel.

In an exemplary embodiment, the present invention relates to a system which includes a system for processing a video signal comprising a video signal input means for receiving a video signal, controller means for receiving input commands and for providing control signals to said system in response thereto, monitoring means for detecting errors in said video signal, said monitoring means storing each detected error with an associated frame identifier, detecting means receiving said video signal from said monitoring means for detecting and correcting illegal color information in said video signal, pixel identification means for identifying video data in said corrected video signal which corresponds to a predetermined pixel location of said video display, and display driving means for driving a video display in response to said corrected video signal.

BRIEF DESCRIPTION OF THE DRAWINGS

The present invention can be further understood with reference to the following description and the appended drawings, wherein like elements are provided with the same reference numerals. In the drawings:

FIG. 4 is a graph illustrating exemplary hard limits, soft limits and gain slopes to adjust illegal colors in the exemplary FIG. 2 embodiment; and FIG. 5 illustrates a piecewise implementation of exemplary hard and soft limits in accordance with the exemplary FIG. 2 embodiment.

DETAILED DESCRIPTION OF THE PREFERRED EMBODIMENTS

1. Video Signal Input

Figure 2:
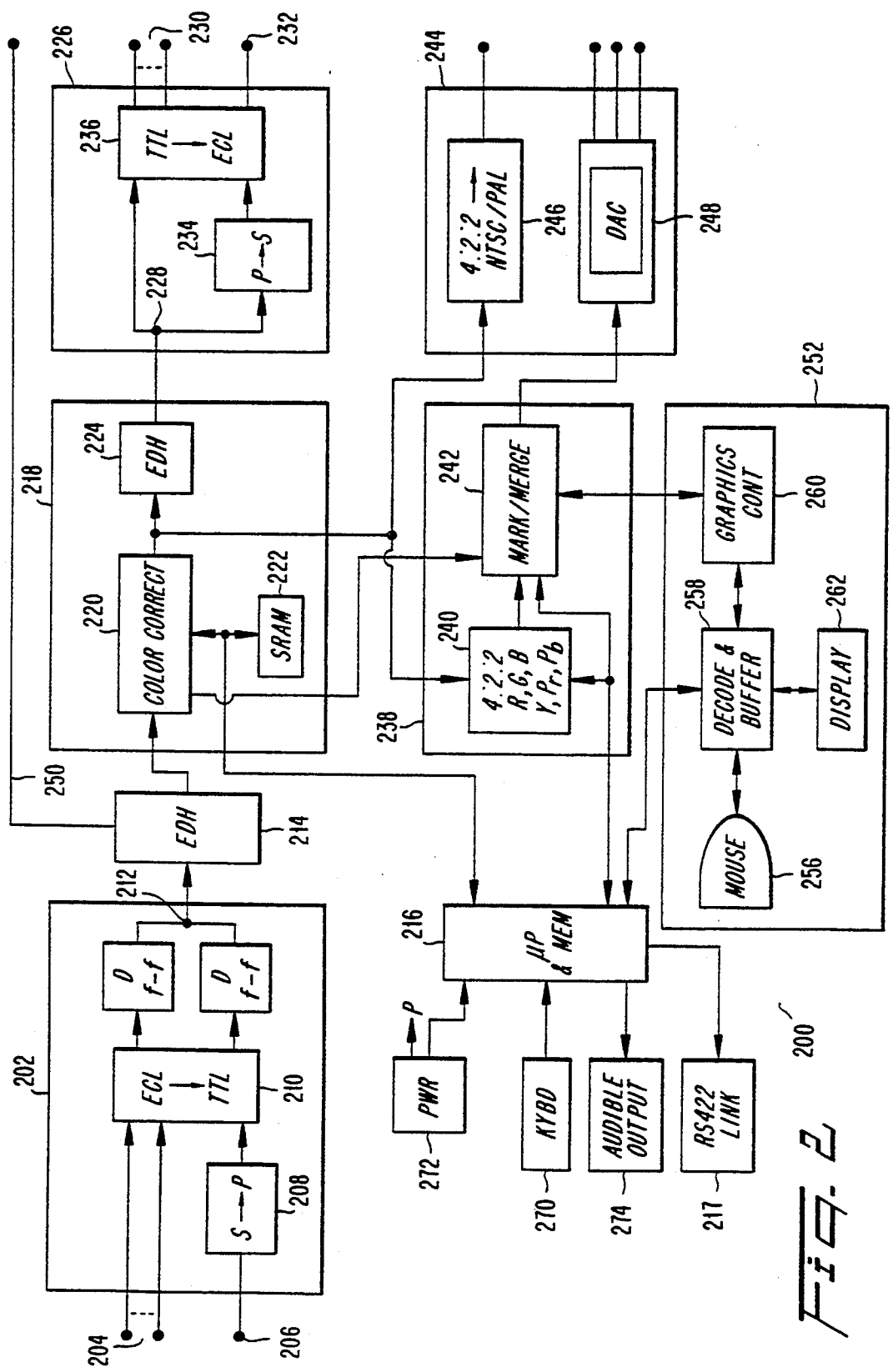
FIG. 2 is a block diagram of a video signal processing system in accordance with an exemplary embodiment of the present invention.

FIG. 2 shows an exemplary system 200 for processing a video signal in accordance with the present invention. The system 200 includes a video signal input means 202 for receiving a video signal. The video signal input means is shown to include a parallel input 204 for receiving the video signal in a parallel format, and a serial input 206 for receiving the video signal in a serial format.

In the FIG. 2 embodiment, the video signal is illustrated as being received in a digital component format such as the 4:2:2 video format. However, those skilled in art will recognize that the video signal can be received in any available video format and converted to the 4:2:2 video format or to any other desired video format for processing in the system 200. The exemplary FIG. 2 embodiment is discussed herein as processing the video signal using the 4:2:2 video format since this is the format used by typical post production studios to achieve high signal quality during editing.

The exemplary FIG. 2 system is designed for parallel processing of the video signal. Accordingly, the video signal input means includes an output 212 for producing a parallel digital output in response to a video signal received on either the parallel input 204 or the serial input 206. While a video signal received at the parallel input 204 can be directly processed by the system 200, a video signal received at the serial input 206 must be converted to a parallel format. A serial-to-parallel converting means 208 is provided for this purpose.

Devices for converting a serial signal to a parallel signal, such as the "Serial Interface/Transmission Decoder", SBX1602A, available from Sony, Corp., are well known and need not be described in detail. The Sony SBX1602A device can be used to convert a serial data stream received at the serial input 206 into a parallel, 11-bit data path (i.e., 10 data bits, and one clock bit) for processing in the system 200. Reference herein to an 11-bit data path is for purposes of discussion only. Those skilled in the art will appreciate that any desired data paths can be used in accordance with the present invention.

The serial and parallel inputs of the system 200 are illustrated as receiving the video signal from emitter coupled logic (ECL). Typically, ECL is used to provide high speed signal processing. Those skilled in the art will appreciate that signal processing performed by the FIG. 2 system 200 can be implemented entirely with ECL components, or any other digital technology.

To reduce fabrication cost, a slower but more cost effective digital technology such as transistor-transistor logic (TTL) can be used to perform video signal processing in the FIG. 2 system. Accordingly, the exemplary video signal input means 202 includes converting means 210. The converting means 210 converts the video signal received at the parallel input 204 or the serial input 206 from a first logic technology (e.g., ECL) to a second logic technology (e.g., TTL). Further, the converting means can include a latch, such as a D flip-flop, for latching the converted, parallel video signal at the output 212.

In accordance with an exemplary embodiment, a video signal received at the parallel input 204 can be a 10 bit data stream generated at a frequency of 27 Megabytes/second. An exemplary video signal received at the serial input 206 can be a waveform having an 800 mV peak amplitude, generated at a frequency of 270 Megabites/second. The video signal produced at the output 212 can, for example, be a 10 bit data stream generated at a rate of 27 Megabytes/second.

In an exemplary embodiment, the video signal input means 202 amplifies the relatively low peak video signal received at either the parallel or the serial input. This amplification permits attenuated signals to be processed in accordance with the present invention (e.g., signals which have travelled over a relatively long cable prior to receipt by the system 200).

2. Error Monitoring And Logging

In an exemplary embodiment, the FIG. 2 video signal processing system 200 includes a monitoring means 214 for detecting errors in the video signal. The monitoring means receives the digital video signal from the output 212 and monitors the video signal for digital data errors. In an exemplary embodiment, the monitoring means includes a conventional error detection and handling (EDH) device.

Proposed SMPTE specification RP165, set forth in a document entitled "Error Detection Checkwords and Status Flags for Use in Bit-Serial Digital Interfaces for Television" describes a technique for error detection and handling (EDH) using checksums. The goal of EDH is to provide some monitoring capability as to the quality of a 4:2:2 digital video signal as that signal is moved from place to place within a post production studio.

EDH is used to detect errors as follows. At a source of the video signal, a series of checksums are computed from the video data on each frame and stored in specific places within the video signal. At a destination of the video signal, the checksums are recomputed and compared with those stored at the source. If the checksums computed at the destination are different than those computed at the source, an error is registered and reported.

A typical use of EDH in a post production studio involves an editor taking pieces from many different sources and combining them into one tape on a destination tape recorder. The EDH checksum is inserted on all source equipment and monitored at the destination tape recorder. If errors are detected at the destination tape recorder, the editor re-records those frames where errors occurred.

The problem with this approach is that editors currently monitor for errors by monitoring the playback heads of a destination tape recorder on a video monitor. This is particularly stressful for the editor because re-cording sequences are typically quite long.

A conventional error logging device is available from Textronix, Inc. for recomputing checksums and recording errors. This device permits the editor to periodically check the error logging device to see if errors had occurred. However, frames that are determined to have errors are not marked in any particular way. A capability is merely provided to notify the editor of how much time has elapsed since the last error was detected.

Thus, conventional devices only tell the editor where errors occurred in a very general sense; i.e., by identifying the time since the last error. They do not describe exactly what video frames contain errors. Because conventional devices do not tell the editor if any other errors occurred before the last detected error, two areas of error data on the source tape cannot be communicated to the editor.

In accordance with a significant feature of the present invention, a frame identifier is used to uniquely identify the frame in which an error was detected. In an exemplary embodiment, the SMPTE time code which is included in a typical video signal can be used as the frame identifier. SMPTE time codes are well known in the television industry as a standard way of identifying specific video frames. For example, video tape recorders use the SMPTE time code to shuttle a tape to an exact video frame specified.

When the monitoring means 214 of the FIG. 2 system detects errant digital data in a frame of the video signal, a flag is set in a conventional manner as described in the previously mentioned SMPTE RP165 document entitled "Error Detection Checkwords and Status Flags for Use in Bit-Serial Digital Interfaces for Television." In accordance with the present invention, a flag generated in response to detection of errant digital data is stored in a register of the monitoring means. Further, a frame identifier (e.g., SMPTE time code) associated with the frame in which errant digital data was detected is also stored in a register.

By maintaining a log of all detected errors along with an associated frame identifier, an editor can access a complete listing of all errors which occur in the video signal. Using the frame identifiers, the editor can quickly move to affected areas of the video signal and re-record bad frames at any time.

Such errors and associated frame identifiers can be displayed on request to the editor. The frame identifiers can be used by the editor to quickly and easily correct errors in the video signal. Further, the frame identifiers allow the editor to re-record the exact frames that are bad with enhanced accuracy since there is no ambiguity as to where the errors exist in the video signal. Error logging in this way guarantees all errors will be logged.

In accordance with the exemplary FIG. 2 embodiment, errant digital data and associated frame identifiers detected by the monitoring means are logged by a system controller, represented as a controller means 216. Communication between the monitoring means 214 and the controller means is performed via a detecting means 218, which is used for color correction in the FIG. 2 embodiment. In an alternate embodiment, communication can be performed directly between the monitoring means the controller means.

3. System Controller

The controller means 216 receives editor input commands via a keyboard 270 and provides control signals to the system in response thereto. In an exemplary embodiment, the controller means can include a Motorola 68331 microprocessor and memory (e.g., EPROM and RAM with battery back-up). Power to controller means, and to all other components of the FIG. 2 system is provided by a power supply 272. Internal memory associated with the controller means 216 can serve as a logging means for storing errors and associated frame identifiers detected by the monitoring means.

As described above, the controller means 216 logs a frame identifier for each video frame of the video signal in which errant digital data is detected by the monitoring means. The controller means 216 includes a recording means for storing the frame identifier whenever any error in the video signal is detected, such that the errors are logged with the frame identifier. In addition to logging all recorded errors in the controller means 216, a signal reflecting detection of each error can be output from the system 200 via a by-pass 250. Further, each detected error can be used to activate an audible output 274.

A standard RS422 link 217 can be used to remotely control the controller means 216. By using such remote control, a plurality of the FIG. 2 systems, each having a controller means (e.g., a controller means 216) can be controlled and monitored from a single remote location. For example, the total number of errors detected in one or all of the controller means can be monitored remotely.

The controller means 216 also represents a editor interface for controlling a detecting means 218. The detecting means detects and corrects illegal colors in the video signal.

4. Illegal Color Detection And Correction

The detecting means 218 receives the video signal from the monitoring means 214. Alternately, where the monitoring means 214 is not included in the FIG. 2 system, the detecting means can receive a video signal directly from the input means 202.

In the exemplary FIG. 2 embodiment, the detecting means receives the video signal in a 10-bit, 4:2:2 video format. The detecting means 218 is provided for detecting and correcting illegal color information in the video signal while maintaining contrast of at least a portion of the corrected video signal proportional to contrast of the uncorrected video signal.

To correct illegal color information while still maintaining contrast proportional to that of the uncorrected video signal, the detecting means 218 of the FIG. 2 system includes a color correcting means 220 and a storage means 222. In an exemplary embodiment, the color correcting means 220 of the detecting means 218 can be configured as a field programmable logic array (FPGA). The use of a field programmable logic array to implement the logic associated with the function of this block permits relatively high speed, real-time processing to be performed on the digital video signal received from the output 212. For example, a field programmable logic array available from Xilinx Corporation can be used to perform 10 bit parallel processing of the digital video signal.

In an exemplary embodiment, the storing means is a SRAM device for storing predetermined criteria. The SRAM device is programmable in response to control signals from the controller means 216. The storage means 222 stores predetermined criteria represents control information which distinguishes a legal color of the video signal from an illegal color. The predetermined criteria are programmed by the editor based on a desired output format of the video signal.

For example, where a desired final format is an analog composite format, the predetermined criteria constitute 4:2:2 video signal color limits. The color limits identify colors in the 4:2:2 video signal which can not be transformed into a legal analog composite signal. Analysis of the video signal to detect illegal colors is performed on a pixel-by-pixel basis.

In accordance with a significant feature of the present invention, the color correcting means 220 identifies pixels of the video signal which contain an illegal color and selectively legalizes colors of the video signal. In addition, the color correcting means 220 produces a 3-bit mark to label pixels which contain illegal color information based on the predetermined criteria.

To maintain contrast of the uncorrected video signal, the predetermined criteria stored in the storing means is used to distinguish illegal/legal colors and to correct illegal colors using soft limits and gain slopes. The individual Y,Cr,Cb components for each pixel of the digital video signal are used to calculate a corresponding peak analog composite value for each pixel. If these calculated values are outside (i.e., above or below) those specified by the editor as "HARDLIMITS" (i.e., for the output format selected by the editor), a particular pixel is considered illegal.

For example, a pixel is illegal and should be highlighted if:

$V_{in}(high) > HARDLIMIT(high)$ OR $V_{in}(low) < HARDLIMIT(low)$
where: $V_{in}(high) = [(Py + C) * .925 + .075] * .714$ volts
for NTSC
$V_{in}(low) = [(Py - C) * .925 + .075] * .714$ volts
$V_{in}(high) = (Py + C) * .7$ volts   for PAL
$V_{in}(low) = (Py - C) * .7$ volts
and, $Py = (Y (4:2:2) - 64)/876$    $Pr = (Cr - 64)/896 - 0.5$
$Pb = (Cb - 64)/896 - 0.5$
$U = 0.874 * Pb$   $V = 1.23 * Pr$   $C = [U^2 + V^2]^{0.5}$ The controller means 216 is capable of storing HARDLIMITS for both NTSC and PAL simultaneously.

Figure 3:
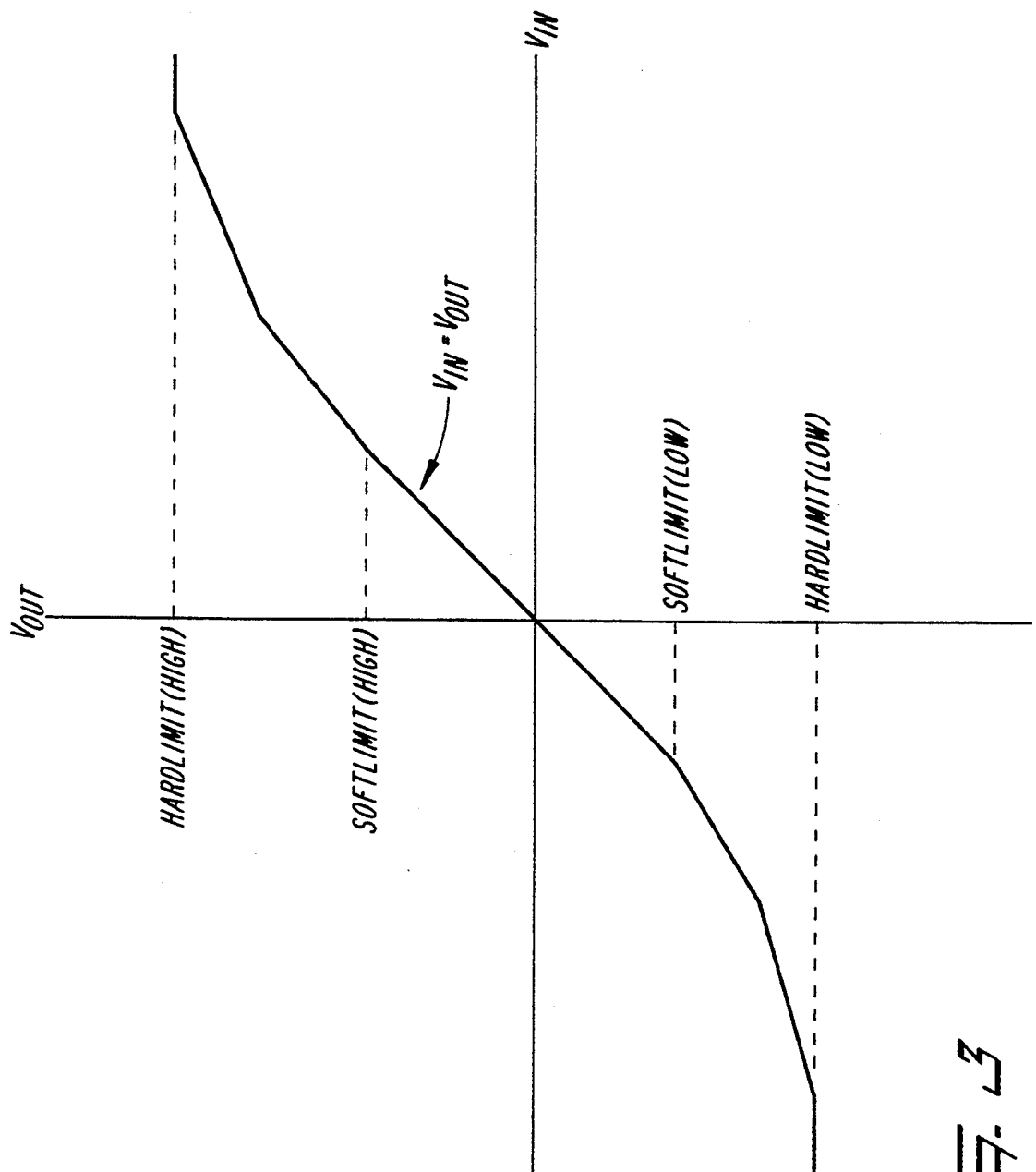
FIG. 3 is a graph illustrating exemplary soft and hard limits which can be used in accordance with the FIG. 2 embodiment.

FIG. 3 shows an exemplary control strategy for the detecting means 218 that uses HARDLIMITS as well as SOFTLIMITS and GAIN SLOPES in accordance with the present invention. A composite value for the video signal received by the detecting means is designated $V_{in}$, with a composite value for a video signal produced at the output of the detecting means being designated $V_{out}$. A relationship of $V_{out} = V_{in}$ is maintained only until the SOFTLIMIT is reached. Beyond the soft limit, the relationship between $V_{in}$ and $V_{out}$ depends on the value of the GAINSLOPE.

As shown in FIG. 4, if the Gain Slope=1 the relationship, $V_{out} = V_{in}$, is maintained until $V_{in} \rightarrow$ HARDLIMIT. Beyond the HARDLIMIT, $V_{out}$ is maintained at the HARDLIMIT. If, however, the GAINSLOPE is made to be less than 1, a transition from the SOFTLIMIT to the HARDLIMIT is smoothed out. Smaller values of the GAINSLOPE will make the transition of $V_{out}$ from the SOFTLIMIT to the HARDLIMIT slower.

Having a GAINSLOPE of less than 1 effectively compresses higher voltages of the composite video signal. Maintaining contrast in the corrected video signal "proportional" to that of the uncorrected video signal refers to an ability of the detecting means to preserve the original image contrast when legalizing a video signal. In this sense, the term "proportional" represents compression of at least a portion of the original video signal to establish at least one SOFTLIMIT whereby the GAINSLOPE is reduced below 1.0. Thus, GAINSLOPE values can be selected to reduce or eliminate the number of illegal colors of the uncorrected video signal which are clipped at the HARDLIMIT.

In accordance with exemplary embodiments, a relationship between $V_{in}$ and $V_{out}$ is implemented in a piecewise linear fashion. For example, FIG. 5 shows various linear regions of Vin that are used in an exemplary embodiment. A value of X is determined such that:

$$Cr' = X*(Cr - 512) + 512 \text{ decimal}$$
$$Cb' = X*(Cb - 512) + 512 \text{ decimal}$$

where Cr' and Cb' are adjusted values of Cr' and Cb'.

The values of B1 through B6 are arrived at using the following equations:

$$B1 = \frac{[\text{HARDLIMIT(low)} - \text{SOFTLIMIT(low)}]}{\text{SLOPE(low)}} + \text{SOFTLIMIT(LOW)}$$

$$B2 = \frac{[\text{HARDLIMIT(low)} - \text{SOFTLIMIT(low)}]}{2 \sqrt{\text{SLOPE(low)}}} + \text{SOFTLIMIT(low)}$$

$$B3 = \text{SOFTLIMIT(low)}$$
$$B4 = \text{SOFTLIMIT(high)}$$

$$B5 = \frac{[\text{HARDLIMIT(high)} - \text{SOFTLIMIT(high)}]}{2 \sqrt{\text{SLOPE(high)}}} + \text{SOFTLIMIT(high)}$$

$$B6 = \frac{[\text{HARDLIMIT(high)} - \text{SOFTLIMIT(high)}]}{\text{SLOPE(high)}} + \text{SOFTLIMIT(high)}$$

These equations for B1 through B6 describe 7 regions and 7 values of X. The value of X is based on the region in which Vin is located. The regions are as described below:

Region 1: Vin < B1
Region 2: B1 <= Vin < B2
Region 3: B2 <= Vin < B3
Region 4: B3 <= Vin < B4
Region 5: B4 <= Vin < B5
Region 6: B5 <= Vin < B6
Region 7: B6 <= Vin The values of X1 through X7 are determined as follows for NTSC, wherein hard and soft limits are in millivolts.

HARD(low) = HARDLIMIT(low)
HARD(high) = HARDLIMIT(high)'
SOFT(low) = SOFTLIMIT(low)
SOFT(high) = SOFTLIMIT(high)
S(low) = GAINSLOPE(low)
S(high) = GAINSLOPE(high)

$$X1_{NTSC} = \frac{1}{C} \frac{7.5 - 0.14 \cdot \text{HARD(low)}}{92.5} + Py$$

$$X2_{NTSC} = \frac{1}{C} \frac{7.5 - 0.14 \cdot \text{HARD(low)}}{92.5} + Py -$$

$$\frac{S(\text{low}) \cdot (Py - C) \cdot 92.5 + S(\text{low}) \cdot 7.5 + 0.14 \cdot \text{SOFT(low)} \cdot (1 - S(\text{low})) - 0.14 \cdot \text{HARD(low)}}{92.5 \cdot (2 - \sqrt{S(\text{low})})}$$

$$X3_{NTSC} =$$

$$\frac{1}{C} \left[ \frac{1 - \sqrt{S(\text{low})}}{92.5} \cdot (92.5 \cdot Py + 7.5 - 0.14 \cdot \text{SOFT(low)}) + C \sqrt{0.14 \cdot \text{SOFT(low)}} \right]$$

$$X4_{NTSC} = 1$$

$$X5_{NTSC} =$$

$$\frac{1}{C} \left[ \frac{\sqrt{S(\text{high})} - 1}{92.5} \cdot (92.5 \cdot Py + 7.5 - 0.14 \cdot \text{SOFT(high)}) + C \sqrt{0.14 \cdot \text{SOFT(high)}} \right]$$

$$X6_{NTSC} = \frac{1}{C} \frac{0.14 \cdot \text{HARD(high)} - 7.5}{92.5} - Py +$$

$$\frac{S(\text{high}) \cdot *(PY + C) \cdot 92.5 + S(\text{high}) \cdot 7.5 + 0.14 \cdot \text{SOFT(high)} \cdot (1 - S(\text{high})) - 0.14 \cdot \text{HARD(high)}}{92.5 \cdot (2 - \sqrt{S(\text{high})})}$$

$$X7_{NTSC} = \frac{1}{C} \frac{0.14 \cdot \text{HARD(high)} - 7.5}{92.5} - Py$$

$$X1_{PAL} = \frac{1}{C} \left[ Py - \frac{(0.143 \cdot \text{HARD(low)})}{100} + Py \right]$$

$$X2_{PAL} =$$

$$\frac{1}{C} \left[ Py - \frac{0.143 \cdot \text{HARD(low)}}{100} - \frac{\begin{array}{c} S(\text{low}) \cdot \\ (Py - C) \cdot 100 + \\ 0.143 \cdot \text{SOFT(low)} \cdot \\ (1 - S(\text{low})) - \\ 0.143 \cdot \text{HARD(low)} \end{array}}{100 \cdot (2 - \sqrt{S(\text{low})})} \right]$$

$$X3_{PAL} =$$

$$\frac{1}{C} \left[ Py - (Py - C) \sqrt{0.143 \cdot \text{SOFT(low)}} - \frac{0.143 \cdot \text{SOFT(low)}}{100} \cdot 1 - \sqrt{S(\text{low})} \right]$$

$$X4_{PAL} = 1$$

$$X5_{PAL} = \frac{1}{C} \left[ \frac{100 \cdot (Py + C) \sqrt{S(\text{high})} + 0.143 \cdot \text{SOFT(high)} \cdot (1 - \sqrt{S(\text{high})})}{100} - Py \right]$$

$$X6_{PAL} =$$

$$\frac{1}{C} \left[ \frac{0.143 \cdot \text{HARD(high)}}{100} - Py + \frac{\begin{array}{c} S(\text{high}) \cdot \\ (Py + C) \cdot 100 + \\ 0.143 \cdot \text{SOFT(high)} \cdot \\ (1 - S(\text{high})) - \\ 0.143 \cdot \text{HARD(high)} \end{array}}{100 \cdot (2 - \sqrt{S(\text{high})})} \right]$$

$$X7_{PAL} = \frac{1}{C} \left[ \frac{(0.143 \cdot \text{HARD(high)})}{100} - Py \right]$$

The detecting means further includes a video data encoding means 224 for encoding the corrected video signal with error detection information. The video data encoding means 224 receives the corrected video signal from the color correcting means 220. The video data encoding means then recalculates new error handling data. For example, new error handling data can be computed as checksums in accordance with the SMPTE RP165 document and encoded on the corrected video signal. The encoded information can then be used by systems receiving the corrected video signal to verify correctness of the video data. This corrected video signal with the new error handling data encoded thereon can be directed to an output interface of the system 200.

5. Output Interface

The output interface is represented in the FIG. 2 system as an output means 226 which is 2O provided for outputting the corrected video signal from the detecting means in a parallel or serial format. The output means 226 includes an input 228 for receiving the corrected video signal from the detecting means 218 in a digital parallel format. The output means 226 further includes a parallel output 230 for directing the corrected video signal from the detecting means 218 to output terminals of the system 200. The output means 226 further includes a serial output 232.

The serial output is produced by a converting means 234 which converts a parallel output of the detecting means to a serial signal via a parallel-to-serial converter. The parallel-to-serial converter can, for example, be configured as the "Serial Interface/Transmission Encoder" SBX1601A, available from Sony, Corp. The Sony SBX1601A device can be used to convert a parallel data stream received at the input 228 into a serial data path for output from the system 200. The FIG. 1 video signal processing system 200 can also include a bi-pass loop for routing serial digital video data directly from the input means 202 to the output means 226.

Further, the output means 226 includes a logic converting means 236 for converting the video signal routed to the parallel output 230 or to the serial output 232 from one digital logic technology (e.g., the TTL Technology of FIG. 2) to another logic technology (e.g., ECL). As with the converting means 210 of the input means, the converting means 236 illustrated in the FIG. 2 system represents an exemplary conversion from TTL to ECL. However, those skilled in the art will appreciate that any digital logic technologies can be used for the FIG. 2 system, and any such digital logic technology used can be converted to any other digital logic technology for output from the FIG. 2 system. Further, the output means 226 can include any necessary amplifiers for driving the video signal outputs to appropriate amplitudes for transmission over any cable lengths connected to the FIG. 2 system.

While the corrected video signal produced by the detecting means can be directly output from the FIG. 2 system via the output means 226, exemplary embodiments of the present invention further include a capability to highlight illegal pixels of the video signal for display to the editor. In an exemplary embodiment, legal pixels which are adjusted to maintain contrast are not highlighted.

6. Highlighting Illegal Colors

In alternate embodiment of the present invention, a highlighting means 238 can receive an output of the detecting means to highlight pixels of the video signal which were identified and labelled by the detecting means to contain illegal color information. The editor can select between various highlighting styles. For example, a pixel that has a peak value above the HARDLIMIT (high) can be made bright red and a pixel that has a peak value below a HARDLIMIT (low) can be made bright green. Alternately, all legal values between the HARDLIMIT (high) and HARDLIMIT (low) can have their luminance content reduced by a factor of two to effectively highlight those pixels that are illegal. Of course, many other highlighting techniques or selections can be used.

In an exemplary embodiment, the highlighting means 238 includes converting means 240 for converting the video signal from the detecting means to an analog video format. Those skilled in the art will appreciate that the converting means can be eliminated if the video signal is highlighted in the video format that this signal is received from the detecting means (e.g., a digital video format). In the exemplary FIG. 2 system, the converting means 240 converts the 4:2:2 digital video signal to a desired display format, such as an R,G,B component format or a Y,Pr,Pb component format. The converting means 240 can be a conventional field programmable logic array such as an FPGA available from Xilinx Corporation.

The converted video signal produced by the converting means 240 is input to a pixel marking means 242 for marking pixels of the video signal identified as having an illegal color. Marked pixels are then merged with the analog component video signal received from the converting means 240. The pixel marking means can, in an exemplary embodiment, be configured using a field programmable logic array such as the Xilinx device described with respect to the color correcting means.

To highlight illegal colors in accordance with the exemplary FIG. 2 system, the pixel marking means 242 receives the three bit input from the detecting means which identifies, on a pixel-by-pixel basis, each pixel that was detected as having an illegal color. The pixel marking means 242 highlights each pixel of the output signal from the converting means when the mark input from the detecting means indicates that a particular pixel was corrected by the detecting means 218. The exact manner by which a pixel is highlighted can be selected by the editor via a user interface of the controller means 216. For example, if the editor wishes to render all corrected pixels green, then each pixel output from the converting means 240 which is associated with a mark from the detecting means would be converted to a green color. As a result, the output from the pixel marking means 242 would be the reproduced video signal wherein all pixels would contain their corrected color unless an original color of that pixel location was determined to be illegal. In the latter case, all pixel locations determined to contain an illegal color by the detecting means would appear green.

The highlighting feature of the highlighting means 238 can be selectively controlled by the controller means 216 so that it can be turned on or turned off. Where the highlighting is turned on, an output would be produced from the highlighting means 238 as discussed above. Where the highlighting feature is turned off, the output from the highlighting means would simply be the video signal with all pixel locations containing their corrected color as determined by the detecting means 218. No highlighting would be included in a video signal produced from the highlighting means in this latter case.

The corrected video signal with or without the highlighting feature activated, produces an output which can be used to drive a video display monitor via a display driver.

7. Display Driver

Figure 1:
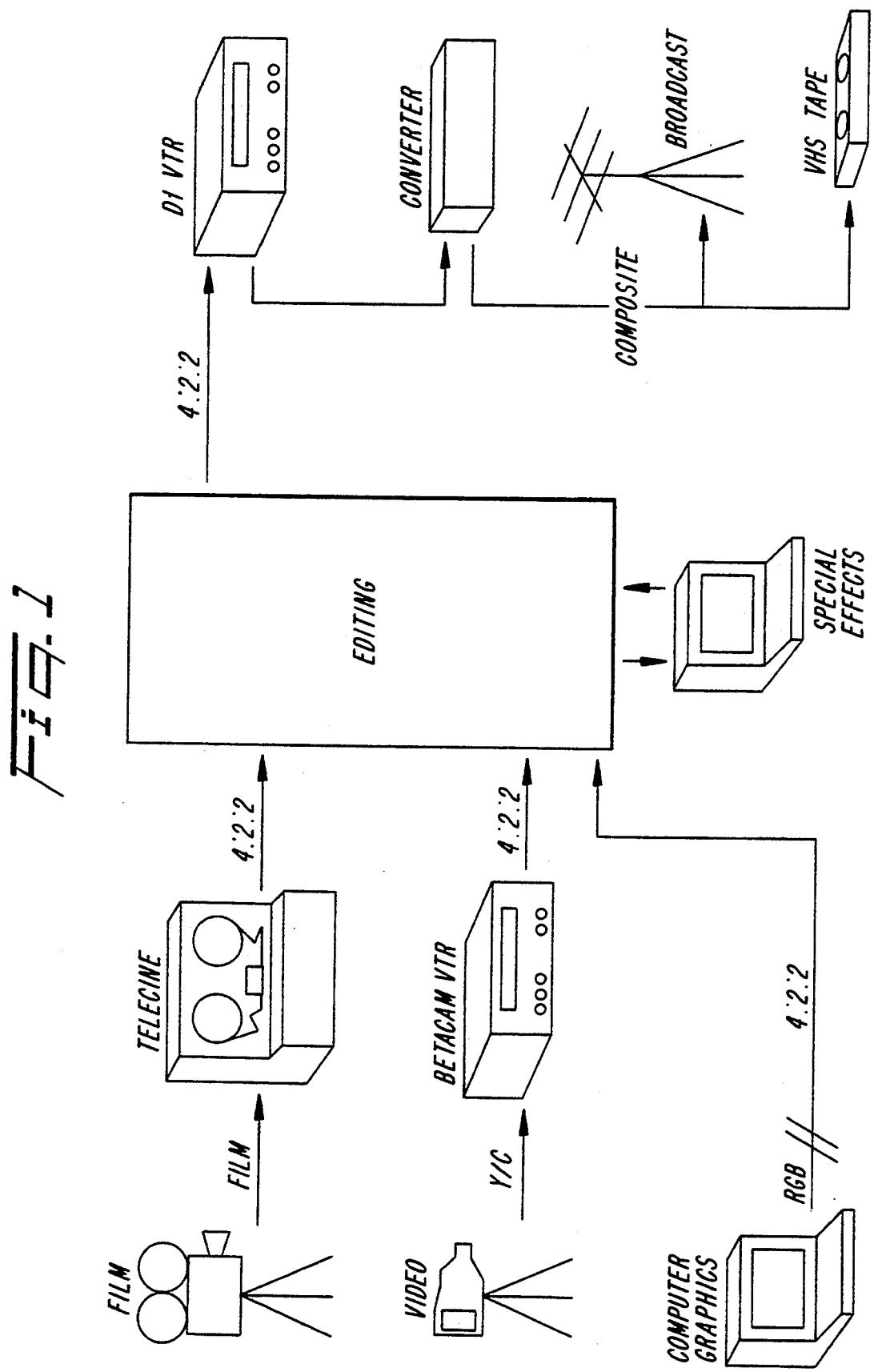
FIG. 1 illustrates exemplary video signal formats used in a 4:2:2 post production studio.

The FIG. 1 video signal processing system 200 further includes a display driving means 244 for driving a video display in response to the corrected video signal. The display driving means includes a first output means 246 for outputting the corrected video signal from the detecting means 218 in an analog composite format, such as the NTSC format or the PAL format. The first output means 246 can be any conventional device for converting a digital 4:2:2 format video signal to an analog composite signal.

The display driving means 244 further includes a second output means 248 for outputting the corrected video signal from the detecting means in a component format. The second output means 248 receives the corrected video signal from the highlighting means, and depending on the editor's selection via the controller means 216, this video signal can selectively include the highlighting information described previously. The second output means includes a triple digital-to-analog converter for driving a video display monitor. For example, the output from the triple digital-to-analog converter can be used to directly drive an analog component monitor.

The ability of the display driving means to provide both component and composite outputs from the system 200 provides the editor enhanced flexibility in monitoring a video signal received by the system 200. For example, the composite video signal produced from the first output means 246 can be used to drive a composite monitor and/or can be used to drive an oscilloscope for monitoring characteristics of the analog composite waveform. The component output can be used to drive a video display monitor for examining those pixels which were highlighted by the highlighting means 238 and/or can be used to drive a component monitor. While the FIG. 2 system does not include a video display monitor on a front panel of the system itself, those skilled in the art will appreciate that such a video display monitor could be incorporated in the system illustrated. Further, those skilled in the art will appreciate that the display driving means can include any means necessary for implementing a desired output format of the corrected video signal.

Thus, the FIG. 1 video signal processing system 200 can drive a video display monitor to highlight illegal colors, allowing the editor to easily see where problems in a video picture are located. The editor can much more easily correct illegal color problems at a location in a video image where the problems actually exist. Further, the use of soft limits and gain slopes in accordance with the FIG. 1 video signal processing system permits the editor added control over how illegal colors are to be modified in a final image. By 15 reducing the gain slope to a value of less than 1, the contrast of an image which includes illegal colors can be maintained, thus improving reproduction of an original image.

8. Pixel Identification

In accordance with yet another aspect of the present invention, the FIG. 1 video signal processing system 200 can be configured to further include a pixel identification means 252. The pixel identification means enables the editor to quickly, easily and accurately analyze digital video signals. Unlike analog video signals, digital video signals can not simply be analyzed by looking at a raw digital waveform. Analyzing analog video signal information is simply a matter of connecting an oscilloscope to the video cable(s) and measuring the analog waveforms. Noise, distortions and other problems in the video information can easily be detected.

However, with the digital 4:2:2 video format of the FIG. 2 system, the video signal is routed from place to place as digital data. The data is either serialized and transmitted on a coaxial cable or transmitted in a 10 bit parallel form. Because the video information is digitized, viewing the signal on an oscilloscope does not provide easy insight as to what information is present. Even though the oscilloscope is capable of making the same distortion measurements on the digital data as it is on analog data, the end results of these measurements are much less clear when digital data is analyzed.

A significant factor which renders displaying meaningful information of a digital video signal difficult is that the digital data is processed by sophisticated equalizers at the receiver. These equalizers are designed to counteract the same effects the oscilloscope might measure. Because of this, inferring actual end performance from measurements made on the transmitting cable is difficult at best.

With a digital video signal, the video information is quantized into pixels which constitute discrete information packets. In the exemplary FIG. 2 system, each pixel is represented by three 10 bit data words. Accordingly, a meaningful analysis of individual pixels of the digital video signal, at both source and destination locations, can provide insight into difficulties editors may be experiencing which could not be detected from an analog signal.

Although logic analyzers have been used for some time to analyze digital data, they are not appropriate in this situation. Simply looking at digital data of a digital video signal on a logic analyzer does not present the video information in a very useful form. For example, it is difficult to tell exactly which portion of the original image is being observed. Also, the logic analyzer only presents the data in the form of one and zeros. Translating this into more useful information cannot be done without significant effort.

The pixel identification means 252 can identify video data in the corrected video signal which corresponds to a predetermined pixel location on a video display monitor. The pixel identification means 252 includes a pixel selecting means 254 controlled by the editor for selecting a predetermined pixel location of the video display monitor. The pixel selecting means 254 includes an instrument 256, such as a mouse or trackball, which is selectively movable by the editor over a grid. The grid has locations which are correlated to pixel locations on the video display monitor. The pixel identification means further includes a decoding means 258 responsive to movement of the instrument 256 for correlating movement of the instrument 256 to a pixel location of the video display monitor.

Decoded outputs from the instrument 256 are input to the controller means 216. The controller means 216 can use the decoded movements of the instrument 256 to control a graphics controller 260. The pixel marking means 242 of the highlighting means 238 can be used to superimpose an identifier generated by the graphics controller 260. For example, a cursor can be superimposed on the corrected video signal produced by the correcting means 220. Thus, as the editor selectively moves the instrument 256 on the grid, a cursor will appear to simultaneously move in a corresponding fashion over the video display monitor driven by the display driving means 244. This allows the editor to quickly select a particular pixel location being displayed on the video display monitor.

The video data associated with a selected pixel can subsequently be displayed to the editor. For this purpose, the pixel identification means 252 includes a display means 262 for displaying the video data which corresponds to the predetermined pixel location selected by the user via the instrument 256. Thus, when the editor moves the cursor to a given pixel location of the video display monitor via movement of the instrument 256, the video data associated with that particular pixel location will be output to the editor via the display means 262. The display means 262 can include, for example, a 2 line, 40 character vacuum florescent display for printing out the pixel data. This pixel data is accessed from the video signal included in the highlighting means, and passed via the controller means 216 through a buffer of the decoding means 258 to the display means 262.

The editor can select to have the data associated with a selected pixel in any number of formats. For example, the FIG. 2 system permits the editor to select one of the following five formats:

(a) YCrCb (10 bit)=The data is converted to its decimal representation and displayed in three data fields: Y,Cr,Cb.

(b) YCrCb (8 bit)—the two least significant bits of the data are first removed; the data is then converted to its decimal representation and displayed in three data fields: Y,Cr,Cb.

(c) R,G,B—The data is converted using the following equations and displayed in three data fields: R,G,B.

$$R = Py - 1.14 * V$$

$$B = Py - 0.581 * V - 0.394 * U$$

$$B = Py + 2.028 * U$$

where, $$Py=(Y(4:2:2)-64)/876 \quad Pr=(C4-64)/896-0.5$$

$$Pb=(Cb=64)/896-0.5$$

$$U=0.874 * Pb \quad V=1.23 * Pr$$

$$C=[U^2+V^2]^{0.5}$$

(d) Composite Max/Min for NTSC and Composite Max/Min for PAL—The data is converted using the following equations and displayed in two data fields: Composite Max, and Composite Min.

---

Max = [(Py + C) * .925 + .075 ] * .714 volts   for NTSC
Min = [(Py − C) * .925 + .075 ] * .714 volts
Max = (Py + C) * .7 volts                      for PAL
Min = (Py − C) * .7 volts
where, Py = (Y (4:2:2) − 64)/876   Pr = (Cr − 64)/896 − 0.5
Pb = (Cb − 64)/896 − 0.5
U = 0.874 * Pb    V = 1.23 * Pr    C = [U^2 + V^2]^0.5

---

(e) Vector format:

Chroma Amplitude = C * 0.7 volts

Chroma Phase = $\tan^{-1}$ (V/U)

where, $$Py=(Y(4:2:2)-64)/876 \quad Pr=(Cr-64)/896-0.5$$

$$Pb=(Cb-64)/896-0.5$$

$$U=0.874 * Pb \quad V=1.23 * Pr \quad C=[U^2+V^2]^{0.5}$$

The pixel identification means is capable of decoding either PAL or NTSC signals.

By displaying the actual video image on a video display monitor and using an instrument such as a mouse/trackball to address any particular pixel, the editor can see exactly what information is contained in the digital data stream. The information is converted and presented to the editor in the separate display means 262 using a format with which the editor is familiar. This provides the editor better insight as to what is being transmitted.

The Y,Cr,Cb formats allow the editor to look at the data as it is encoded onto the video data stream. Certain aspects of the system performance can thus be examined. For example, Y values in the active video image that are larger than 254 decimal (8 bit) are reserved for synchronization and should not appear in the active video region. These values can thus be identified and corrected by the editor. Further, the R,G,B and Vector formats which are familiar to most editors can be used to color match particular areas of the video signal on the video display monitor.

The Composite Max/Min format can be used to determine if a particular pixel's amplitude will be too large or too small when the video image is converted from the 4:2:2 format to the composite analog format. Amplitudes that are too large or too small lead to illegal colors and picture distortions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. System for processing a video signal comprising:
   a video signal input means for receiving a video signal;
   controller means for receiving input commands and for providing control signals to said system in response thereto;
   monitoring means connected with said controller means for detecting errors in said received video signal, said monitoring means storing each detected error with an associated frame identifier;
   detecting means, receiving said received video signal from said monitoring means, for detecting and correcting illegal color information in said received video signal to provide a corrected video signal;

pixel identification means for identifying video data in said corrected video signal which corresponds to a predetermined pixel location of a video display; and display driving means for driving said video display in response to said corrected video signal.

2. System according to claim 1, wherein said video signal input means further includes:

a serial input for receiving said video signal in a serial format;

a parallel input for receiving said video signal in a parallel format;

an output for producing said received video signal as a parallel output in response to said video signal received on either said serial input or said parallel input; and means for converting said video signal received at said parallel input or said serial input from a first digital logic technology to a second digital logic technology.

3. System according to claim 1, wherein said controller means further includes:

means for logging detected errors and associated frame identifiers from said monitoring means such that said errors are recorded with a frame identifier and accessible by an editor.

4. System according to claim 1, wherein said detecting means further includes:

storage means for storing predetermined control information which distinguishes a legal color of said received video signal from an illegal color based on predetermined criteria; and color correcting means for identifying pixels of said received video signal which contain an illegal color in response to said predetermined criteria and for selectively legalizing colors of said received video signal while maintaining contrast of at least a portion of the corrected video signal proportional to contrast of the uncorrected video signal.

5. System according to claim 4, wherein said storage means includes:

a SRAM device for storing said predetermined criteria, said SRAM device being programmable in response to control signals of said controller means.

6. System according to claim 4, wherein said detecting means further includes:

video data encoding means for receiving and encoding said corrected video signal with error detection information.

7. System according to claim 1, further including:

an output means for outputting said corrected video signal from said detecting means in a serial format or a parallel format, said output means further including:

an input for receiving said corrected video signal from said detecting means in a serial format;

a parallel output for outputting said corrected video signal in a parallel format;

a serial output for outputting said corrected video signal in a serial output; and means for converting said corrected video signal received from said detecting means from one digital logic technology to another digital logic technology.

8. System according to claim 1, further including:

highlighting means for highlighting pixels of said video display wherein an illegal color was detected by said detecting means, said highlighting means further including:

means for marking pixels of said received video signal identified as having an illegal color.

9. System according to claim 1, wherein said display driving means further includes:

output means for outputting said corrected video signal by selectively highlighting pixels wherein an illegal color was identified.

10. System according to claim 9, wherein said output means further includes:

a digital to analog converter for converting said corrected video signal to an analog format.

11. System according to claim 1, wherein said pixel identification means further includes:

pixel selecting means for selecting said predetermined pixel location of said video display; and display means for displaying said video data which corresponds to said predetermined pixel location.

12. System according to claim 11, wherein said pixel identification means further includes:

decoding means responsive to said pixel selecting means for correlating movement of said pixel selecting means to a pixel location of a video display.

13. System according to claim 12, wherein said pixel selecting means is an instrument selectively moveable over a grid having grid locations correlated to pixel locations of a video display.

14. Apparatus for processing a video signal comprising:

a video signal input means for receiving a video signal;

controller means for receiving input commands and for providing control signals in response thereto; and monitoring means connected to said controller means for detecting errors in said received video signal, said monitoring means storing each detected error with an associated video frame identifier which is included as data within said received video signal and which is used to identify a location of each detected error in the received video signal.

15. Apparatus according to claim 14, wherein said controller means further includes:

means for logging detected errors and associated video frame identifiers from said monitoring means such that each detected error is recorded with a video frame identifier transmitted with said recieved video signal and is accessible by an editor.

16. Apparatus for processing a video signal comprising:

a video signal input means for receiving a video signal;

controller means for receiving input commands and for providing control signals in response thereto; and detecting means, connected with said controller means for receiving said received video signal from said video signal input means, and for detecting and correcting illegal color information in said received video signal while maintaining contrast of at least a portion of the corrected video signal proportional to contrast of the uncorrected video signal.

17. Apparatus according to claim 16, further including:

highlighting means for highlighting pixels wherein an illegal color was detected, said highlighting means further including:

means for marking pixels of said received video signal identified as having an illegal color.

18. Apparatus for processing a video signal comprising:

a video signal input means for receiving a video signal;

controller means for receiving input commands and for providing control signals in response thereto;

detecting means, receiving said received video signal from said video signal input means, for detecting and correcting illegal color information in said received video signal; and highlighting means, responsive to said control signals, for highlighting pixels of said corrected video signal wherein an illegal color was identified.

19. Apparatus according to claim 19, wherein said highlighting means further includes:

means for marking pixels of said corrected video signal identified as having an illegal color.

20. Apparatus for processing a video signal comprising:

a video signal input means for receiving a video signal;

controller means for receiving input commands and for providing control signals in response thereto;

pixel selecting means for selecting a predetermined pixel location of a video display; and display means, responsive to said control signals, for displaying video data which corresponds to said predetermined pixel location selected by said pixel selecting means.

* * * * *